UNITED STATES PATENT OFFICE.

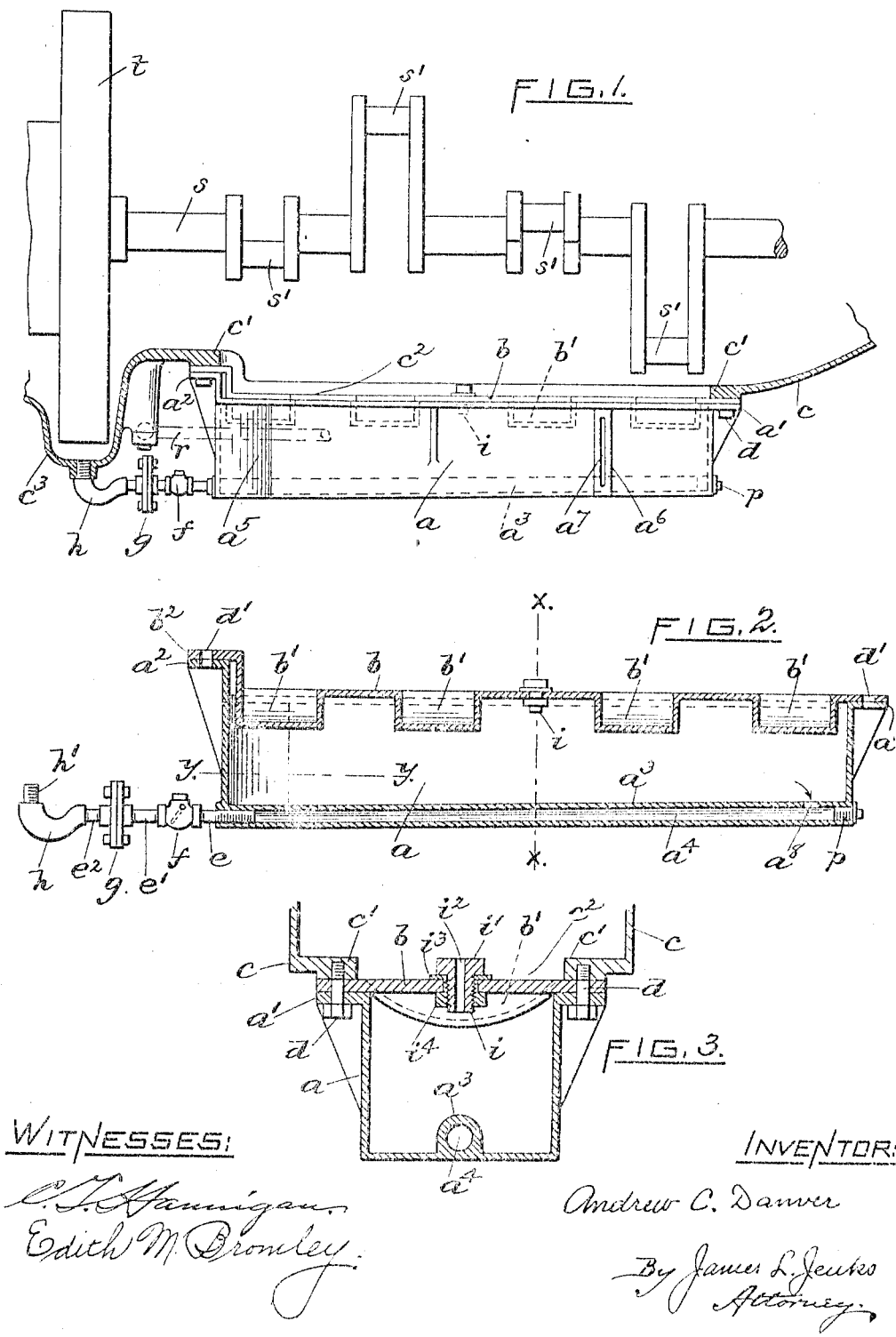

ANDREW C. DANVER, OF PROVIDENCE, RHODE ISLAND.

AUXILIARY OILING DEVICE FOR AUTOMOBILES.

1,120,137.  Specification of Letters Patent.  Patented Dec. 8, 1914.

Application filed February 15, 1913. Serial No. 748,697.

*To all whom it may concern:*

Be it known that I, ANDREW C. DANVER, a citizen of the United States, residing at Providence, in the county of Providence and State of Rhode Island, have invented certain new and useful Improvements in Auxiliary Oiling Devices for Automobiles, of which the following is a specification.

My invention relates to improvements in auxiliary oiling systems for automobiles, and the purpose of my invention is to provide a device by which the supply of oil used in lubricating the engine of an automobile may be increased in volume so as not to require replenishing so often; also to provide for a circulation of the oil from the main supply to the auxiliary supply and back again, with means of filtering the same between the auxiliary tank and the main supply tank; and especially to provide a means of regulating the oil supply to the engine so that an excess of oil may be avoided.

My device is intended to be applied to automobiles of the type in which the fly-wheel case is used as an oil reservoir, and in which the oil is splashed or driven into the crank case by means of the spokes and rim of the fly-wheel thence flowing back over the bottom of the crank case to the fly-wheel case.

I accomplish these results with the mechanism shown in the accompanying drawing, in which—

Figure 1 is an elevation of a crank shaft, fly-wheel, and crank case of an automobile having my auxiliary system attached. Fig. 2 is a vertical longitudinal section through the auxiliary tank, and Fig. 3, a vertical cross-section upon the plane $x—x$ of Fig. 2. The same parts are designated by the same letters throughout the several drawings.

In Fig. 1, $t$ is a fly-wheel of an automobile; $s$ the crank shaft; $s'—s'$, etc. the cranks; $c^3$ represents the fly wheel case serving as an oil reservoir in which reservoir the fly-wheel runs; $c—c$ being the crank case the bottom of which in automobiles of this type is flat or level; while $c^2$ is the level or flattened bottom of the crank case, and $c'—c'$ a thickened margin of the crank case around its lower surface. In most of the automobiles of this type, there are depressions $b'—b'$, etc., seen best in Fig. 2, into which the lower end of the connecting rod dips when the engine is in operation, and the oil is supposed to flow back by gravity into the reservoir wheel case $c^3$ after a certain amount of it has been splashed into the bottom of the crank case. In practice, however, it is found that the splashing force of the fly-wheel is so great, especially when the engine is speeded up, that much more oil than is needed is forced into and kept in the crank case thus causing a smoky exhaust and excessive carbonization and sooting of cylinder and spark plugs. My device, which is designed to remedy this trouble, consists substantially of an auxiliary tank, or reservoir, $a$, bolted to the bottom of the original crank case $c—c$ by means of the bolts $d—d$, or in some other secure manner. This auxiliary tank $a$ connects with the crank case by an opening in the bottom thereof into which is screwed the tubular nipple $i—i'$, shown in section in Fig. 3, this nipple being adjustably secured to the bottom of the crank case $c$ by the nut $i^4$. The upper portion of this nipple is not flush with the bottom of the crank case but projects above the same as shown in Figs. 1, 2 and 3; the amount of projection determining the permanent level of the oil in the crank case, and this amount of projection may be varied by varying the thickness of the washer $i^3$.

At the bottom of the auxiliary tank $a$ is the tubular projection or pipe $a^3—a^4$, shown in section in Figs. 2 and 3. This pipe $a^3—a^4$ is provided at one end with the plug $p$ and also has an orifice $a^8$, Fig. 2, opening into the auxiliary tank $a$. The bottom of the auxiliary tank when the automobile is level slopes backward, as is seen, toward the fly-wheel case $c^3$ and this pipe $a^3—a^4$ is connected with the bottom of the fly-wheel case $c^3$ by the connections $e—e'—e^2$, $h$ and $h'$. Between the auxiliary tank $a$ and the fly-wheel case $c^3$ are interposed the check valve $f$ and a filter $g$ the purpose of which will be subsequently shown. The tank $a$ is also provided with a glass gage $a^5—a^7$ for the purpose of showing the level of the oil therein.

The check valve $f$ is provided so that in case of a descent of unusual steepness the oil will not work its way back through the bottom of the fly-wheel case $c^3$ into the auxiliary tank $a$; while the filter $g$, consisting simply of two flanges inclosing a wire netting of suitable mesh, provides for a constant cleansing of the oil of all sediment and abrasions of metal from the bottom of the crank case.

The filter, as above stated, insures the cleanliness of the oil and is a great improvement over the present system of oiling in automobiles of the type described for the reason that without my device a sudden change of level in the automobile from descent to ascent washes all sediment from the bottom of the crank case $c$—$c$ back into the fly-wheel case $c^3$ so that metallic particles are apt to be splashed up by the fly-wheel and are liable to injure the working parts of the engine.

Having now described my invention, what I claim and desire to secure by Letters Patent is—

1. The combination with a crank case provided with a fly-wheel case in open communication with the crank case, and serving as an oil reservoir from which oil is splashed by the fly-wheel into the crank case, of means for disposing of excess oil in the crank case and returning it to the fly-wheel case, comprising an auxiliary oil-tank below the crank-case, a pipe connecting said auxiliary tank with the lower portion or oil reservoir of the fly-wheel case, and means for delivering oil from the crank-case to said auxiliary tank.

2. The combination with a crank case provided with a fly-wheel case in open communication with the crank case, and serving as an oil reservoir from which oil is splashed by the fly-wheel into the crank case, of an auxiliary oil tank below the crank case, an oil conduit within the auxiliary tank, a pipe connecting one end of said conduit with the reservoir-portion of the fly-wheel case, and an adjustable outlet in the bottom of the crank case for regulating the discharge of oil therefrom to said auxiliary tank.

In testimony whereof I affix my signature in presence of two witnesses.

ANDREW C. DANVER.

Witnesses:
 ROSCOE M. DEXTER,
 EDITH M. BROMLEY.